US007716272B2

(12) United States Patent
Skwarek et al.

(10) Patent No.: US 7,716,272 B2
(45) Date of Patent: May 11, 2010

(54) ANALYSIS OF OPERATIONS HAVING INPUT AND OUTPUT PARAMETERS AND RELATING TO NETWORK SERVICE

(75) Inventors: Jaroslaw Skwarek, Helsinki (FI); Janne Saarela, Espoo (FI)

(73) Assignee: Tieto Ojy, Helsinki (FI)

( * ) Notice: Subject to any disclaimer, the term of this patent is extended or adjusted under 35 U.S.C. 154(b) by 1405 days.

(21) Appl. No.: 10/830,423

(22) Filed: Apr. 23, 2004

(65) Prior Publication Data
US 2005/0021776 A1    Jan. 27, 2005

(30) Foreign Application Priority Data
Apr. 24, 2003    (FI)    ................... 20030622

(51) Int. Cl.
G06F 17/30    (2006.01)
H04L 29/08    (2006.01)

(52) U.S. Cl. .................. 709/201; 709/217; 709/218; 709/228; 709/229; 709/238; 709/246; 703/22; 715/255; 707/E17.006

(58) Field of Classification Search ................ 709/201, 709/217–218, 228–229, 238, 246; 707/E17.006; 703/22; 715/255
See application file for complete search history.

(56) References Cited

U.S. PATENT DOCUMENTS

| 5,463,563 | A | * | 10/1995 | Bair et al. ...................... 716/11 |
| 5,513,323 | A |   | 4/1996  | Williams et al. |
| 5,568,605 | A | * | 10/1996 | Clouston et al. ................ 714/4 |
| 5,933,356 | A | * | 8/1999  | Rostoker et al. .............. 703/15 |
| 6,006,233 | A | * | 12/1999 | Schultz ....................... 707/101 |
| 6,292,804 | B1 | * | 9/2001  | Ardoin et al. ................ 707/102 |
| 6,738,955 | B2 | * | 5/2004  | Andersen et al. ................ 716/4 |
| 6,804,563 | B1 | * | 10/2004 | Lafaye de Micheaux ...... 700/51 |
| 7,017,129 | B2 | * | 3/2006  | Ouyang ......................... 716/4 |
| 7,054,311 | B2 | * | 5/2006  | Norman et al. ............. 370/378 |
| 7,065,588 | B2 | * | 6/2006  | Konda et al. ................ 709/246 |
| 7,127,439 | B2 | * | 10/2006 | Jannarone et al. ............. 706/25 |
| 7,200,668 | B2 | * | 4/2007  | Mak et al. .................... 709/230 |
| 7,340,534 | B2 | * | 3/2008  | Cameron et al. ............ 709/246 |
| 7,509,398 | B2 | * | 3/2009  | Acharya et al. ............. 709/219 |
| 2003/0005145 | A1 | * | 1/2003 | Bullard ....................... 709/238 |
| 2003/0023701 | A1 | * | 1/2003 | Norman et al. ............. 709/214 |

(Continued)

OTHER PUBLICATIONS

Klingemann, Justus, et al., "Deriving Service Models in Cross-Organizational Workflows", RIDE-Information Technology for Virtual Enterprises (RIDE-VE '99).
Hoschek, Wolfgang, "A Data Model and Query Language for Distributed Service Discovery", pp. 1-10.

(Continued)

*Primary Examiner*—Alina N. Boutah
(74) *Attorney, Agent, or Firm*—Arent Fox LLP (57) ABSTRACT

The present invention relates to a method of creating a data model for analysis of operations relating to services and to a method for analyzing such a data model. The operations involve parameters, and each operation has at least one input parameter and at least one output parameter. In the a data model there are nodes representing the parameters and directed relations representing the operations, and a directed relation representing an operation connects at least one node representing said at least one input parameter of the operation to at least one node representing said at least one output parameter of the operation. Computer programs and computers for creating or analyzing services using the described data model are also discussed.

21 Claims, 7 Drawing Sheets

U.S. PATENT DOCUMENTS

| | | |
|---|---|---|
| 2003/0036917 A1 | 2/2003 | Hite et al. |
| 2003/0041095 A1* | 2/2003 | Konda et al. ............... 709/201 |
| 2003/0130947 A1* | 7/2003 | Benantar .................... 705/44 |
| 2003/0191803 A1* | 10/2003 | Chinnici et al. ............ 709/203 |
| 2003/0204645 A1* | 10/2003 | Sharma et al. ............. 709/328 |
| 2004/0103076 A1* | 5/2004 | Casati et al. ................... 707/1 |
| 2004/0181537 A1* | 9/2004 | Chawla et al. ............. 707/100 |
| 2005/0034107 A1* | 2/2005 | Kendall et al. ............. 717/136 |
| 2008/0046568 A1* | 2/2008 | Broda et al. ............... 709/227 |

OTHER PUBLICATIONS

Hoschek, Wolfgang, "A Unified Peer-to-Peer Database Framework for Scalable Service and Resource Discovery", pp. 1-14.

Lacher, Martin S., et al., "On the Integration of Topic Maps and RDF Data", pp. 1-14.

Impress (Espirit project n° 6355), "Specification of Graph Views and Graph Operators", Jul. 1993, pp. 1-56.

Wolter, R., "XML Web Services Basics", Microsoft Corporation XP002272523 (Dec. 2001).

* cited by examiner

| Table 1. WSDL extracts for Services1 |
|---|
| WSDL document 1 |
| `<xsd:import namespace="http://schemas.org/phones/" schemaLocation="http://schemas.org/phones/schema.xsd"/>`<br>`<xsd:simpleType name="email">`<br>`<xsd:restriction base="xsd:string">`<br>`<xsd:pattern value=" \w+@\w+\.\w+" />`<br>`</xsd:restriction>`<br>`</xsd:simpleType>`<br>`<xsd:element name="gsm" type="phone:gsm" />` |
| `<wsdl:message>`<br>`<wsdl:part name="query" type="email" />`<br>`</wsdl:message>`<br>`<wsdl:message>`<br>`<wsdl:part name="response" element="gsm" />`<br>`</wsdl:message>` |
| `<wsdl:operation name="gsmquery">`<br>` <input name="query" />`<br>`<output name="response" />`<br>`</wsdl:operation>` |
| `<wsdl:portType name="GsmQuery">`<br>`   <wsdl:operation name="gsmquery" />`<br>`</wsdl:portType>` |
| `<service name="Services1" binding="LocationQuery">`<br>`   <address location="http://www.company1.com/services" />`<br>`</service>` |

Fig. 5

| Table 2. WSDL extracts for Services2 |
|---|
| WSDL document 2 |
| <xsd:import namespace="http://schemas.org/phones/" schemaLocation="http://schemas.org/phones/schema.xsd"/><br><xsd:simpleType name="location"><br><xsd:restriction base="xsd:string"><br><xsd:maxLength value="120" /><br></xsd:restriction><br></xsd:simpleType><br><xsd:element name="gsm" type="phone:gsm" /> |
| <wsdl:message><br><wsdl:part name="query" element="gsm" /><br></wsdl:message><br><wsdl:message><br><wsdl:part name="response" type="location" /><br></wsdl:message> |
| <wsdl:operation name="locationquery"><br>  <input name="query" /><br>  <output name="response" /><br></wsdl:operation> |
| <wsdl:portType name="LocationQuery"><br>  <wsdl:operation name="locationquery" /><br></wsdl:portType> |
| <service name="Services2" binding="LocationQuery"><br>  <address location="http://www.company2.com/services" /><br></service> |

ANALYSIS OF OPERATIONS HAVING INPUT AND OUTPUT PARAMETERS AND RELATING TO NETWORK SERVICE

FIELD OF THE INVENTION

The present invention relates to operations having input and output parameters. The present invention also relates to a computer program product and to a computer for analyzing operations having input and output parameters. The present invention can be used, for example, for analyzing services provided from sources connected to a communication network.

BACKGROUND OF THE INVENTION

Various services are available for users connected to a communication network. These services include, without limiting to these, services available over the Internet or various intranet applications or services available over telephone networks. In the following services available via a network will be referenced to as network services. The network services are available from sources connected to the communication networks. A source may be an entity such as a server or other data storage and processing device. The term service provider will be used to refer to any source where a network service is available.

The number of network services, which are provided over communication networks, increases constantly, and the variety of network services increases as well. Network services may be implemented using proprietary techniques, as long as a common interface for accessing the network services is provided. Currently Uniform Resource Identifiers (URIs), HyperText Markup Language (HTML) and HyperText Transfer Protocol (HTTP) are examples of basic protocols for accessing network services. These techniques are well known by the skilled person, and are therefore not described in any greater detail here.

The World Wide Web Consortium (W3C) has been developing Semantic Web services in a bottom-up fashion, where the basic building block is Recourse Description Framework (RDF) technology. This technology provides a data model for expressing machine-understandable semantics.

Web Services technologies, on the other hand, have been developed and introduced by software vendors. Web Services is a set of technologies that address the communication between different information processing architectures over a network element. W3C is standardising technologies relating to Web Services, and generally Web Services are currently understood as Simple Object Access Protocol (SOAP) layered services on the Internet. SOAP enables the invocation of services using a protocol payload encoded in Extensible Markup Language (XML) and carried over various protocols such as HyperText Transfer Protocol or Simple Mail Transfer Protocol (SMTP).

Network services can be described in a declarative fashion using Web Services Description Language (WSDL); the current versions of WSDL are version 1.1 and version 1.2. WSDL embeds information about data types, message structures, interaction models (port types), protocol bindings and service points.

Currently Web Services is understood as software components that expose their functionality using simple object Access Protocol (SOAP) and are able to describe this functionality using Web Services Description Language (WSDL) technology. One problem with Web Services is the lack of automating composite services where multiple services are automatically invoked in order to have a set of input data mapped to a set of output data. In addition, the current technologies do not address automated reachability analysis over the service descriptions.

It shall be appreciated that although the above discussed problems relate to Web services, similar disadvantages may be associated with network services pursuant to other frameworks or with services within an information technology system as well. Thus the description is not limited to Web Services, but discusses them as examples.

SUMMARY OF INVENTION

It is an aim of embodiments of the present invention to address one or more of the problems discussed above.

According to a first aspect of the present invention there is provided a method of creating a data model for analysis of operations relating to services, the operations involving parameters and each operation having at least one input parameter and at least one output parameter, the method comprising creating a data model having nodes representing the parameters and directed relations representing the operations, a directed relation representing an operation connecting at least one node representing said at least one input parameter of the operation to at least one node representing said at least one output parameter of the operation.

According to a second aspect of the present invention there is provided a method for analyzing operations relating to services, the operations involving parameters and each operation having at least one input parameter and at least one output parameter, the method comprising analyzing a data model having nodes representing the parameters and directed relations representing the operations, a directed relation representing an operation connecting at least one node representing said at least one input parameter of the operation to at least one node representing said at least one output parameter of the operation.

According to a third aspect of the present invention there is provided a computer program comprising program instructions for causing a computer to perform the method of any of the appended method claims.

According to a fourth aspect of the present invention there is provided a computer for creating a data model for analysis of operations relating to services, the operations involving parameters and each operation having at least one input parameter and at least one output parameter, the computer comprising means for creating a data model having nodes representing the parameters and directed relations representing operations, a directed relation representing an operation connecting at least one node representing said at least one input parameter of the operation to at least one node representing said at least one output parameter of the operation.

According to a fifth aspect of the present invention there is provided a computer for analyzing operations relating to services, the operations involving parameters and each operation having at least one input parameter and at least one output parameter, the computer comprising means for analyzing a data model having nodes representing the parameters and directed relations representing operations, a directed relation representing an operation connecting at least one node representing said at least one input parameter of the operation to at least one node representing said at least one output parameter of the operation.

BRIEF DESCRIPTION OF FIGURES

For a better understanding of the present invention and as how the same may be carried into effect, reference will now be made by way of example only to the accompanying drawings in which.

DETAILED DESCRIPTION OF PREFERRED EMBODIMENTS OF THE INVENTION

Figure 1:
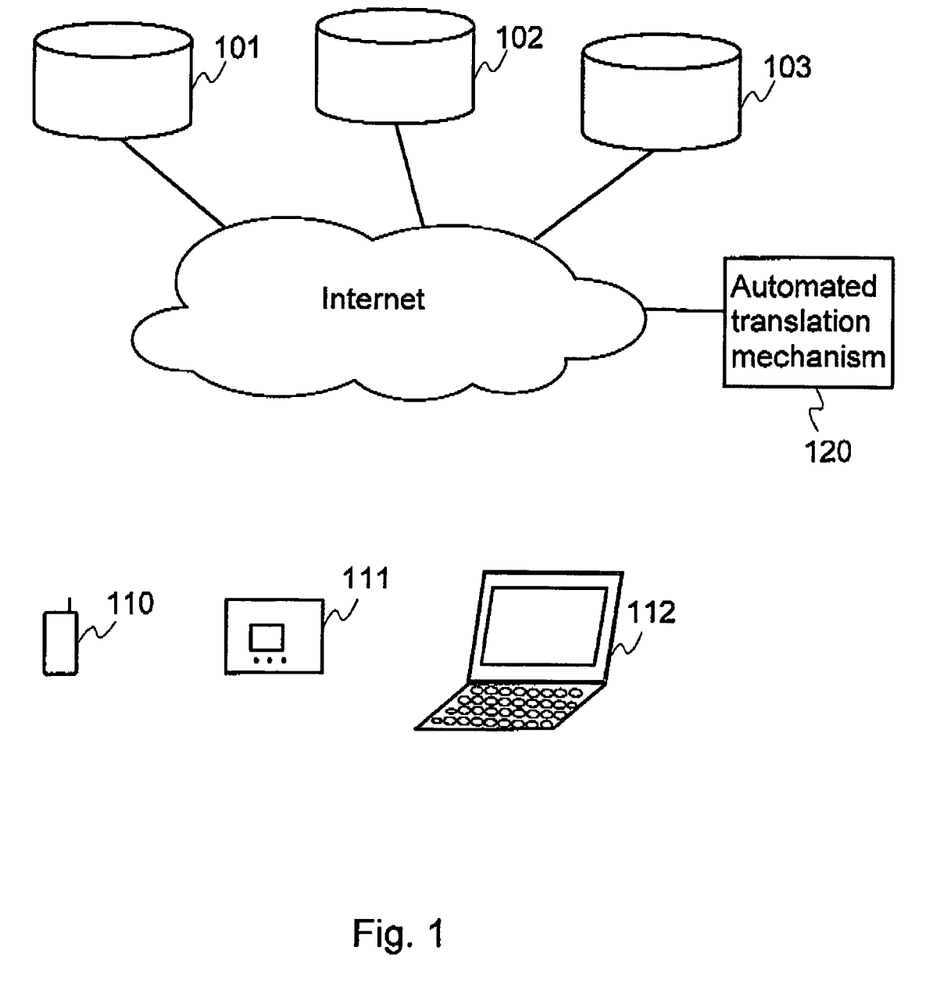
FIG. 1 shows an example environment for the invention.

FIG. 1 shows an exemplifying environment wherein the invention can be embodied. Different services (Service1 101, Service2 102, Service3 103) are provided to users via a communication network. In FIG. 1 this communication network is the Internet. The services can be accessed using various terminal equipment, such a mobile telephone 110, a personal digital assistant 111 or a computer 112, which are provided with communication equipment for accessing the Internet via an access network. The functionality of the embodiments of the invention may be implemented in a server 120.

Figure 2:
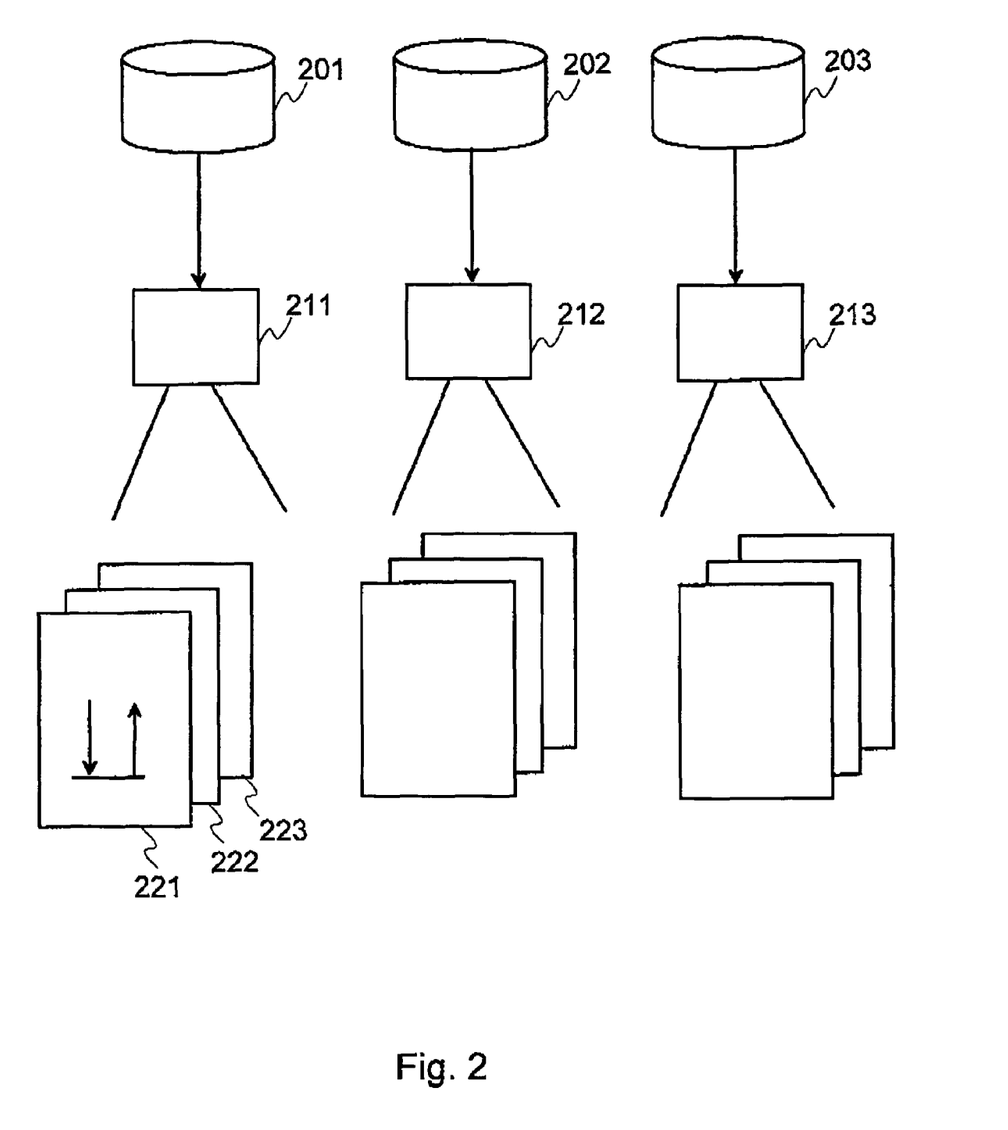
FIG. 2 schematically illustrates service descriptions.

FIG. 2 schematically illustrates service descriptions. In FIG. 2, there are a number of separate systems 201, 202 and 203, which provide services. These systems also provide declarative service descriptions 211, 212, 213 of their services. A service description may, in turn, specify for an operation input parameter(s) and output parameter(s).

In FIG. 2 these operation descriptions are shown with blocks 221, 222, 223. Alternatively, a service description may specify only one service or the operations may be called, for example, sub-services. The term operation used in this description and in the appended claims is intended to cover also a single operation within a service (commonly referred to as "a service") or a sub-service within a service.

It shall be appreciated that operations, which require no input parameters or which provide no output parameters are also possible. Since such operations are not essential in understanding or for the operation of present invention, they are not discussed in more detail here.

A method for creating data model for analyzing the operations may fetch the service descriptions in the beginning of the analysis process, or they may be spontaneously sent to the analyzing arrangement, for example to a computer equipped with suitable program code, when the services are set up, modified or updated.

In a first embodiment of the invention, a data model is created for a plurality of service descriptions. In the data model in this first embodiment there are nodes for parameters relating to operations within the plurality of service descriptions. Furthermore, for each operation within the plurality of service descriptions, there is a directed relation associating the input parameter(s) of an operation with the output parameter(s) of the operation. The data model can thus be seen as being a directed graph.

Preferably, to keep the data model as simple as possible and as light to process as possible, there is in the data model for a certain parameter or for a plurality of parameters referring to a single concept only one node having a unique node identifier. A unique identifier refers here to an identifier unique within the data model, that is unique within the plurality of services which are to be analyzed. If, for example, services provided in a closed system are analyzed, it is sufficient that the identifiers are unique within that closed system. An example of a closed system is, for example, an intranet of a certain company. In certain applications the identifiers may be globally unique. For example, in analyzing operations/services provided over the Internet, globally unique identifiers for the directed relations and the nodes enable automatic invocation of operations/services.

It may be possible to represent a plurality of parameters referring to a single concept with more than one node, but this makes the data model mare complex and requires some additional means for linking together those nodes, which represent parameters referring to a single concept.

Especially when a data model is created using information available about the services (service descriptions), this information usually contains more information about the parameters than just parameter identifiers or names. This additional information, i.e. characteristics of the parameters, may be used for drawing conclusions about those parameters, which actually refer to a same concept. Later, if only the data model with node identifiers is available, it may be practically impossible to recognize that two (or more) nodes having different node identifiers actually represent a single concept.

As mentioned above, if a number of parameters have different identifiers in connection with different operations but they all still refer to a certain specific concept, all these different parameter identifiers are preferably associated with a unique node identifier. The node identifier may be globally unique. Globally unique is a requirement which fulfils the uniqueness property independent of environmental properties such as location, time, computer hardware and software where it is created. This node identifier may be one of the parameter identifiers in the service descriptions or composed based on such a parameter identifier. Should parameters referring to a single concept have different identifiers in connection with different operations, there may be need to keep track on the correspondence between the parameter identifiers in service descriptions and the node identifier, for example, for allowing automatic invocation of operations.

The directed relations may also be assigned with identifiers, which are unique within the data model. These identifiers may even be globally unique and composed based on the respective operation identifiers in such a way that a directed relation identifier supports automatic service/operation invocation. See below for some examples on determining identifiers for the directed relations.

If an operation involves, say, many input parameters and one output parameter, the directed relation in the data model representing this operation associates each input parameter of the operation to the output parameter. Similarly, if an operation provides more than one output parameter for one input parameter, the respective directed relation associates the input parameter to the output parameters. If an operation provides a plurality of output parameters and inputs also a plurality of parameters, then each of the input parameters is associated with each of the output parameters. In all these cases, the name of the associations is preferably the same for keeping the data model simple.

Once the data model has been created, it is possible to use the data model for analyzing operations. The creation of a data model and the analysis of the data model can be made by different parties or by a single party. In the analysis it is possible to determine, for example, the transformation path from a node representing a given input parameter (or nodes representing given input parameters) to a node representing a given output parameter (or nodes representing given output parameters). A transformation path from a node representing an input parameter to a node representing an output parameter may be found, for example, by going through all possible paths starting from the node representing the given input parameter. If there are many paths connecting the node representing the given input parameter to the node representing the given output parameter, the shortest path may be selected as the transformation path. Finding or selecting a shortest path is a problem commonly addressed in optimization.

The transformation path defines an order for operations for reaching the given output parameter(s) starting from the given input parameter(s). The input parameter(s) for an operation at a certain point of the transformation path belong to a parameter set formed by the given original input parameter(s) and the output parameters of the operations preceding this operation in the transformation path. The transformation path also defines the relevant input parameters for each operation along the transformation path.

The analysis of the data model can alternatively or also include reachability analysis. Reachability analysis means determining which output parameters can be reached given at least one input parameter. Reachability analysis means basically study of all paths starting from the given input parameter(s) (or nodes) and listing the parameters (nodes) along the paths.

Both the transformation path information and the reachability information can be determined using, for example, transitive closure algorithms known to a person skilled in the art. There are many algorithms for computing transitive closures or shortest paths in directed data models, and information on these can be found, for example, on basic textbooks on data processing or optimization. As two examples, Warshall's algorithm may be used for reachability analysis and Floyd's algorithm may be used for finding a shortest path between two nodes.

Furthermore, once a transformation path has been determined, it is possible to invoke the operations in the order defined by the transformation path. This enables automatic execution of services for a user (human user or a local or remote software application).

In a second embodiment of the invention, multiple service descriptions are processed and analyzed by transforming the service descriptions first into one homogenous preliminary data model.

Figure 3:
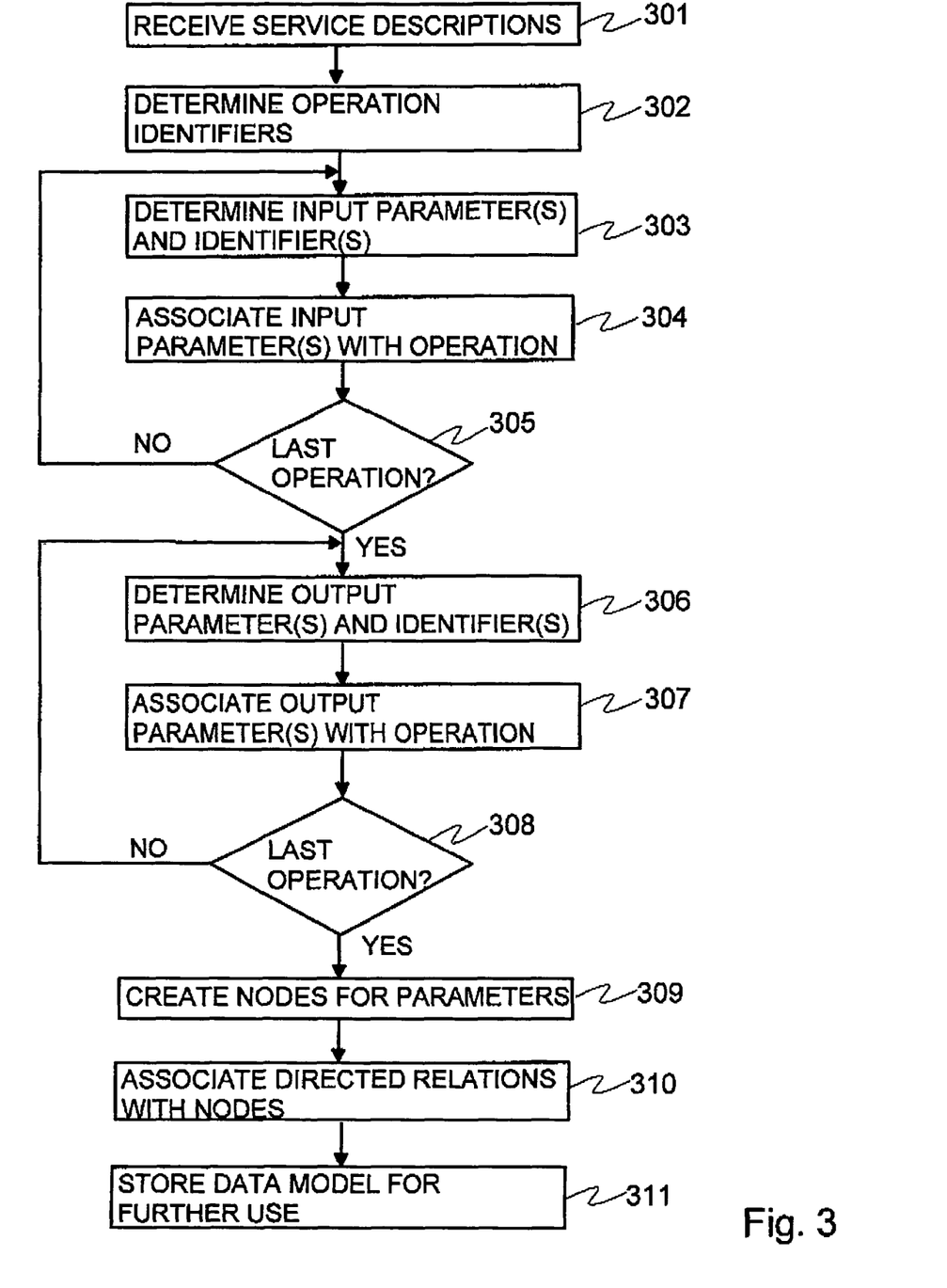
FIG. 3 shows a flowchart of a method in accordance with a second embodiment of the invention.

FIG. 3 shows a flowchart of a method 300 in accordance with the second embodiment of the invention. The service descriptions are received in step 301; this step may be carried out separately before the rest of the method steps or in connection with the other method steps. A preliminary data model is created in steps 302-308 by going through the operation definitions. An identifier is determined for an operation in step 302; this identifier is unique among the operations, which are to be analyzed. Advantageously, the identifier is globally unique for enabling automatic invoking of services/operations. In the service descriptions there usually is information characterizing the parameters, and this information may be used for drawing conclusions about the concept to which a certain parameter refers. The input parameter or parameters for the operation and their identifiers are determined in step 303. Unique identifiers are determined in step 303 for referring to the parameters; unique identifiers means that a parameter referring to a same concept in any operation or service has the same identifier and this identifier, on the other hand, distinguishes the parameter from other parameters.

In step 304 an association is made between the input parameter or parameters and the operation. Steps 303 and 304 are repeated for each operation to be analyzed within the plurality of service descriptions (step 305). The output parameter or parameters of the operation and their identifiers are determined in step 306. Similarly as for input parameters, the identifiers of the output parameters are unique within the preliminary data model. In step 307 an association is made between the output parameter or parameters and the operation. Steps 306 and 307 are carried out until all operations to be analyzed have been studied (step 308). When parameter identifiers are determined in steps 303 and 306, it may be checked if an identifier for a parameter referring to a specific concept has been already determined in connection with an earlier operation. A same identifier is used for a specific parameter irrespective of it being used as an input or as an output for an operation.

In the second embodiment of the invention, the actual data model is created in steps 309 and 310. In step 309 a unique node is created for each unique parameter identifier in the preliminary data model. An identifier of the node is preferably the unique identifier of the parameter. Alternatively, it is possible to keep track of a mapping between the node identifiers and parameter identifiers. In step 310 a directed relation is created for each such operation in the preliminary data model which is to be taken into account in subsequent analysis. The directed relation directs from the input parameter or parameters of an operation to the output parameter or parameters of the operation. The identifier of the directed relation is preferably the unique identifier of the operation. Alternatively, it is possible to keep track of a mapping between the directed relation identifiers and the operation identifiers. In step 311 the spanned directed graph, that is the actual data model, is stored for further use.

The steps 302-308 for creating the preliminary data model are described above as an example. It is possible to create the preliminary data model by going through the operation definitions in other order as the one discussed above. For example, it is possible to determine both input and output parameters for an operation and associate also the output parameters to the operation in, connection with step 303 and 304. Generally the identifiers for the parameters need to be determined before the parameters can be associated with the operations.

As discussed above, the preliminary data model may have the following characteristics: the operations have unique identifiers, parameters have unique identifiers, input parameters are associated with the respective operations, and output parameters are associated with the respective operations. The unique parameter identifiers are preferably used as node identifiers and the operation identifiers are preferably used as directed relation identifiers in the actual data model.

The following is a simple example illustrating the second embodiment of the invention. Assume there are two information technology systems that provide descriptions of their services. The first system supports a query interface that takes an email address as input and returns a mobile telephone number as output. The second system supports a query interface that takes a mobile telephone number as input and returns location information of the user as output.

Applying an automated translation mechanism in accordance with the second embodiment of the invention to this setting results in a preliminary data model with the following characteristics. The identifiers for the parameters and operations have been selected arbitrarily so that they are unique within the preliminary data model. The query interface (operation) of the first system is identified with a globally unique identifier 'A', and the query interface (operation) of the second system is identified with a globally unique identifier 'B'. The email address is assigned with a globally unique identifier 'C', the mobile phone number is assigned with a globally unique identifier 'D', and the location information is assigned with a globally unique identifier 'E'.

The input and output parameters are associated with the operations (query interfaces) in the following way. The email address identifier is associated with the operation identifier (A, input, C) and the mobile phone number identifier is associated with the operation identifier (B, input, D). The mobile phone number identifier is associated with the operation identifier (A, output, D) and the location information identifier is associated with the operation identifier (B, output, E).

The preliminary data model has thus the following associations: (A, input, C), (B, input, D), (A, output, D) and (B, output, E). This preliminary data model is used to create the actual data model. The actual data model in this example has three nodes {C, D, E} representing the parameters in the preliminary data model and directed relations {A (C, D), B (D, E)} representing the associations in the preliminary data model.

The resulting actual data model can be used to determine for example the transformation path from an email address to location information. In addition, the actual data model can be used for reachability analysis, that is, for determining that both the mobile telephone number and location information can be reached given an email address.

As discussed above, it is possible not to create a preliminary data model, but creating first the preliminary data model and then the actual data model provides at least the advantage of making the creation of the actual data model and the automated translation mechanism easier to implement.

A third embodiment of the invention relates to Web Services, and is explained here in the context of the WSDL version 1.1 and RDF version 1.0. A service description in WSDL contains the following definitions. Types, which refer to data types, are defined by an embedded XML Schema within the WSDL description. Messages define message structures which can use XML Schema basic data types or types defined in the types section. A port is a set of abstract operations and the message structures they use. Bindings define operations of a given port to actual formats and protocols. A service defines a group of port together into an actual URI address, where the messages can be invoked. A service address in WSDL does not uniquely identify an operation. URI addresses are here mentioned as an example of a service addressing scheme. Suitable alternatives are, for example, Digital Object Identifiers (DOI) or Universal Unique Identifiers (UUID).

A method in accordance with the third embodiment of the invention is described below and reference is made to FIG. 3 where appropriate. When a WSDL version 1.1 document is analyzed, the following steps are performed. First a preliminary RDF data model is created (cf. steps 302-308). The WSDL operations are assigned Uniform Resource Identifiers through an algorithm that guarantees the URI to be globally unique. In this regard a reference can be made to the example below describing one specific algorithm. This may involve concatenating an identifier of a parameter with a string containing the URI of the service. This step corresponds to step 302 in FIG. 3. The input parameter (or parameters) for an operation are assigned a URI, which can be obtained from embedded or imported XML Schemas, should the XML Schema use namespaces. Otherwise this URI is generated using an algorithm that guarantees the resulting URI to be globally unique (see the example below for one specific algorithm). This step corresponds to step 303 in FIG. 3. Similarly as in step 304, the input parameter or parameters are associated with the WSDL operation URI with a relation. Output parameter or parameters for the operation are also assigned globally unique identifiers (cf. step 306), and the output parameters are associated with the WSDL operation URI with relation (cf. step 307).

The resulting preliminary RDF data model is then analyzed (cf. steps 309 and 310) and the actual data model, which is also an RDF data model, is created. For each parameter in the preliminary RDF data model a node is created with its URI, and for each WSDL operation a directed relation is assigned from the input node to the output node. The directed relation is assigned the operation URI.

Figure 4:
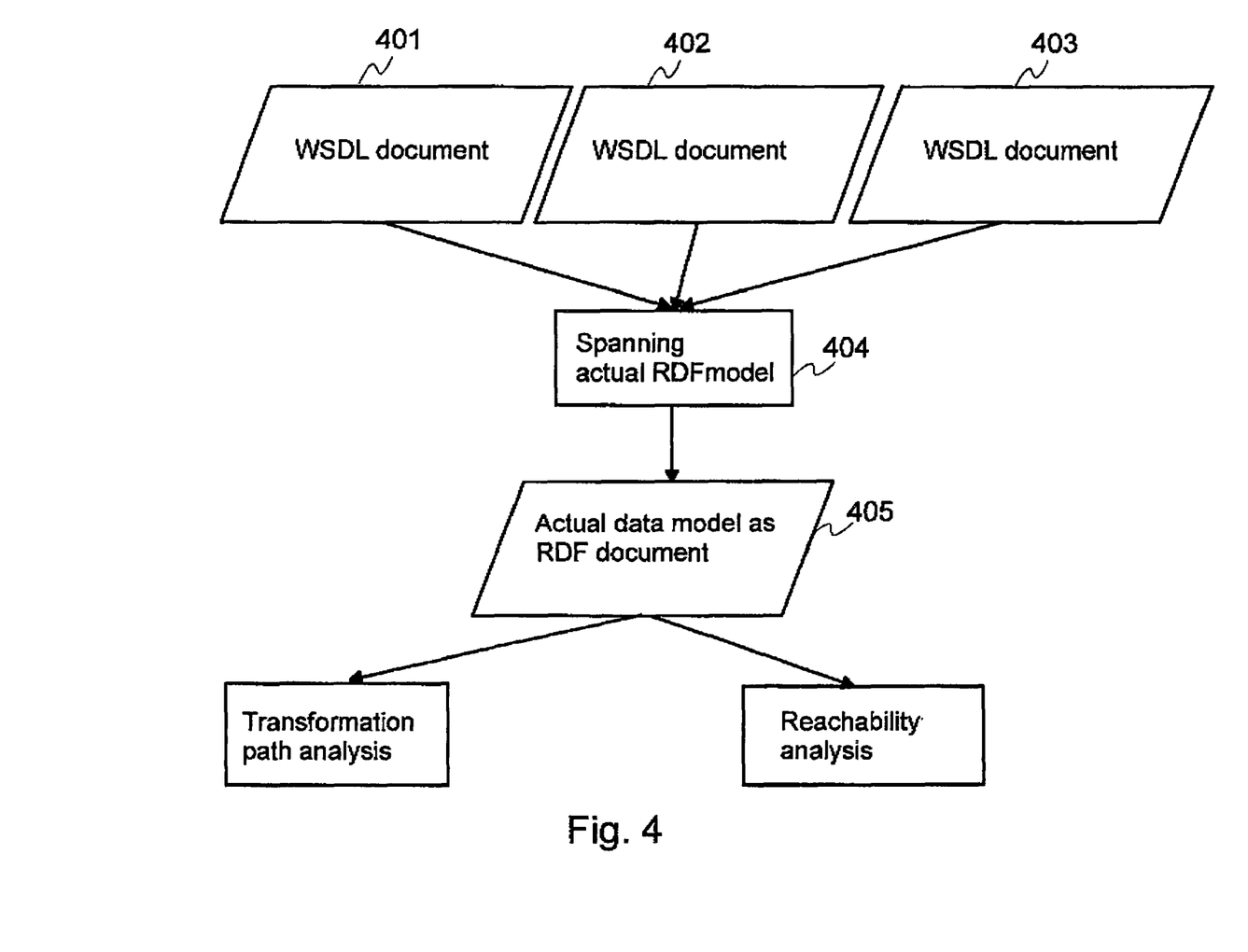
FIG. 4 shows an overview of a third embodiment of the invention.

FIG. 4 shows schematically the third embodiment of the invention. WSDL documents (block 401, 402, 403) are used as input for the automated translation mechanism. By analyzing these WSDL documents, the preliminary RDF data model is created and based on the preliminary RDF data model the actual RDF data model is spanned (block 404). The actual RDF data model is saved as a RDF document (block 405), and the saved RDF document can be used, for example, for transformation path analysis or for reachability analyses.

Figure 5:
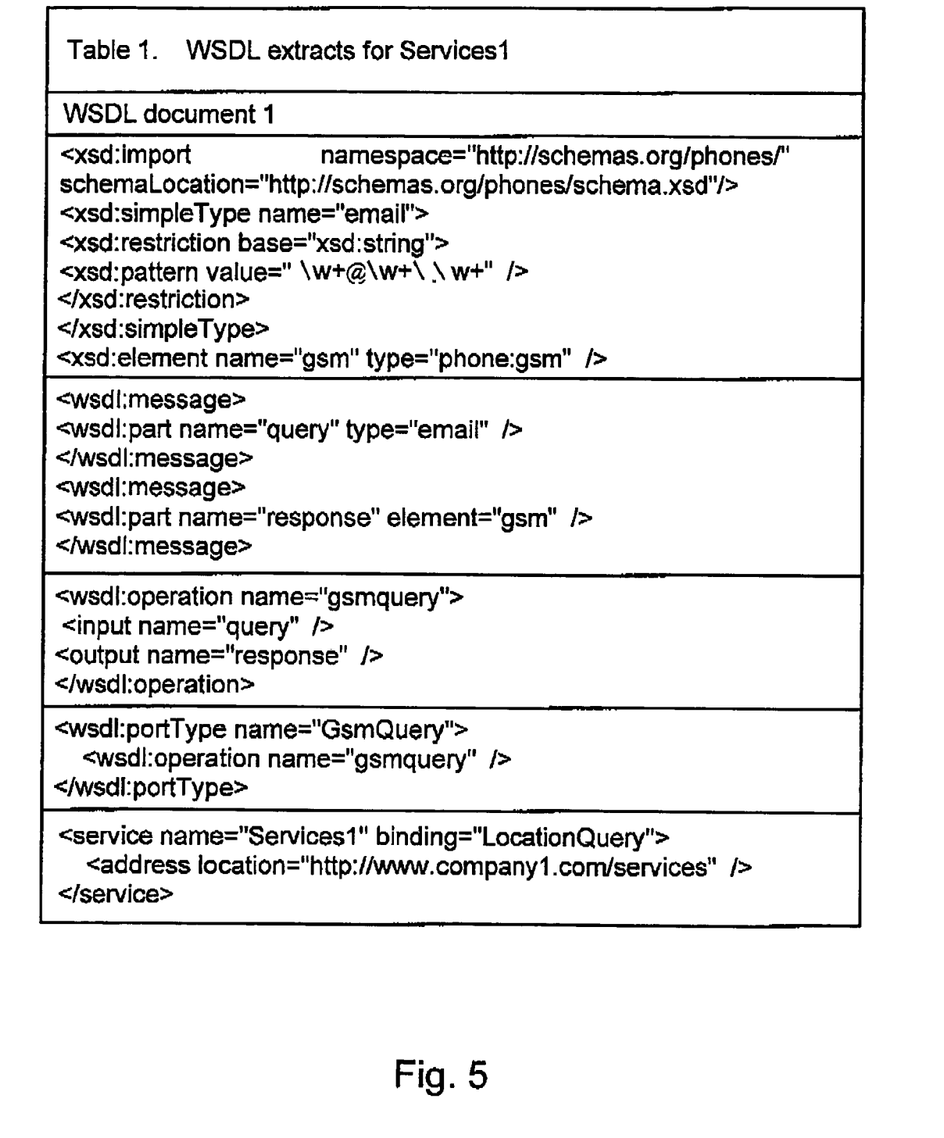
FIG. 5 shows a table illustrating as an example a service description of a first service.
Figure 6:
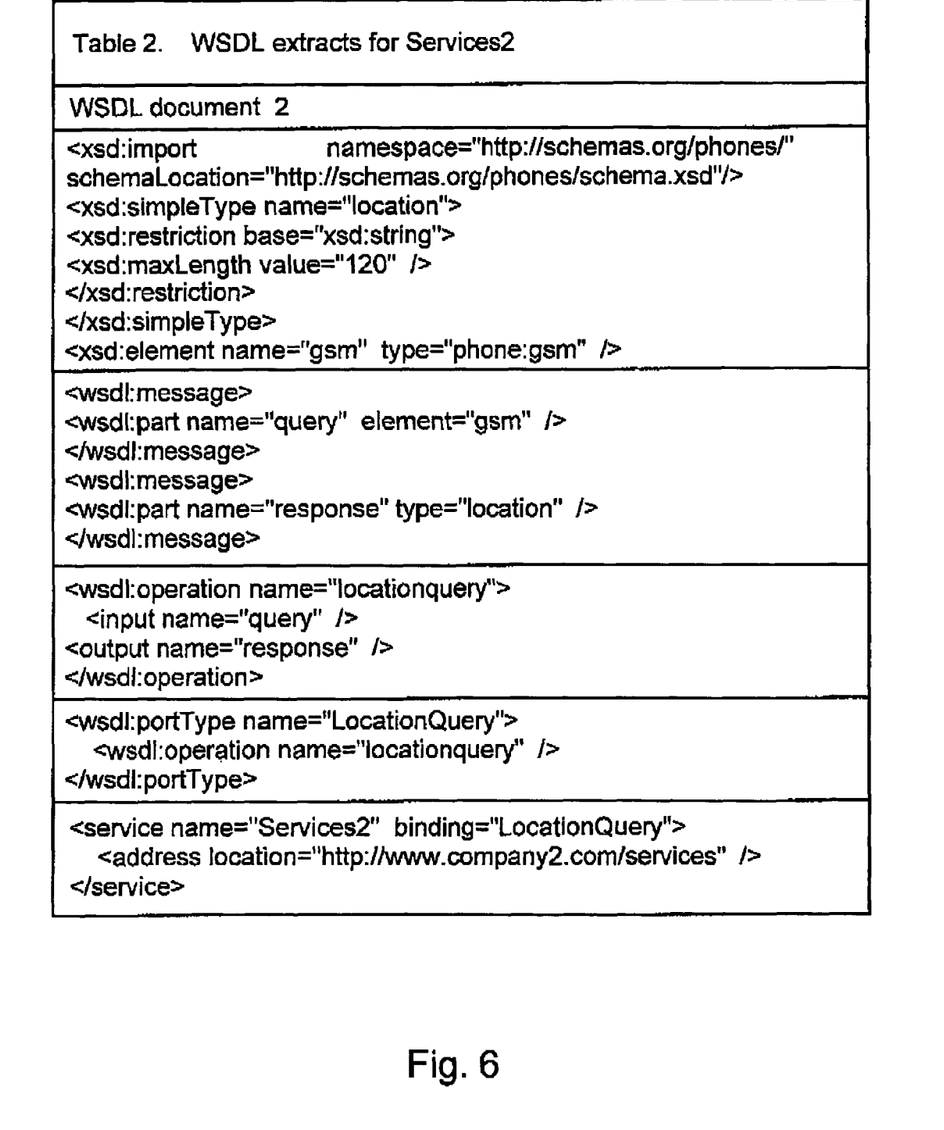
FIG. 6 shows a table illustrating as an example a service description of a second service.

The following is a detailed example of generating RDF data models by starting from WSDL service descriptions. The operations and parameters are in this example the same as in the example discussed above in connection with the second embodiment of the invention, but in this case the two information technology systems provide a WSDL V1.1 description of SOAP accessible services. The services named Services1 and Services2 are described as WSDL extracts in Tables 1 and 2, which are in the appended FIGS. 5 and 6.

First identifiers are determined for the operations (cf. step 302). The gsm query operation of the first system is identified with a globally unique identifier, a generated URI http://www.company1.com/services#operation_gsmquery.

Similarly, the query interface of the second system is identified with a globally unique URI http://www.company2.com/services#operation_locationquery.

These synthetic addresses use the fragment identifier #, and the string "operation_" indicates that these URIs are operation identifiers.

Identifiers are next determined for input parameters (cf. step 303). The email address and the mobile phone number are assigned with respective globally unique identifiers, generated URIs http://www.company1.com/services#type_email and
http://www.company2.com/services#type_gsm.

Similarly, these synthetic addresses use the fragment identifier #, and the string "type_" indicates that these URIs are parameter identifiers.

The input parameters are associated with the operations (cf. step 304). The email address identifier is associated with the gsm query operation identifier and the mobile phone number identifier is associated with the location query operation identifier:

(http://www.company1.com/services#operation_gsmquery, input, http://www.company1.com/services#type_email) and
(http://www.company2.com/services#locationquery, input, http://www.company2.com/services#type_gsm).

Identifiers are next determined for output parameters (cf. step 303). Mobile phone number has already been assigned with an identifier, but the location information is at this point assigned with a globally unique identifier, a generated URI http://www.company2.com/services#type_location.

The mobile phone number identifier is associated with the operation identifier
(http://www.company1.com/services#operation_gsmquery, output, http://www.company2.com/services#type_gsm) and location information identifier is associated with the operation identifier
(http://www.company2.com/servic:es#locationquery, output,
http://www.company2.com/services#type_location).

This preliminary RDF data model is then used to create the actual RDF data model as follows.

The actual RDF data model has nodes:
(http://www.company1.com/services#type_email,
http://www.company2.com/se.cvices#type_gsm,
http://www.company2.com/services#type_location).

Furthermore, the actual RDF data model has the following directed relations:
{http://www.company1.com/servicen#operation_gsmquery
(http://www.company1.com/services#type_email,
http://www.company2.com/services#type_gsm),
http://www.company2.com/services#locationquery
(http://www.company2.com/services#type_gsm,
http://www.company2.com/services#type_location)}.

Figure 7:
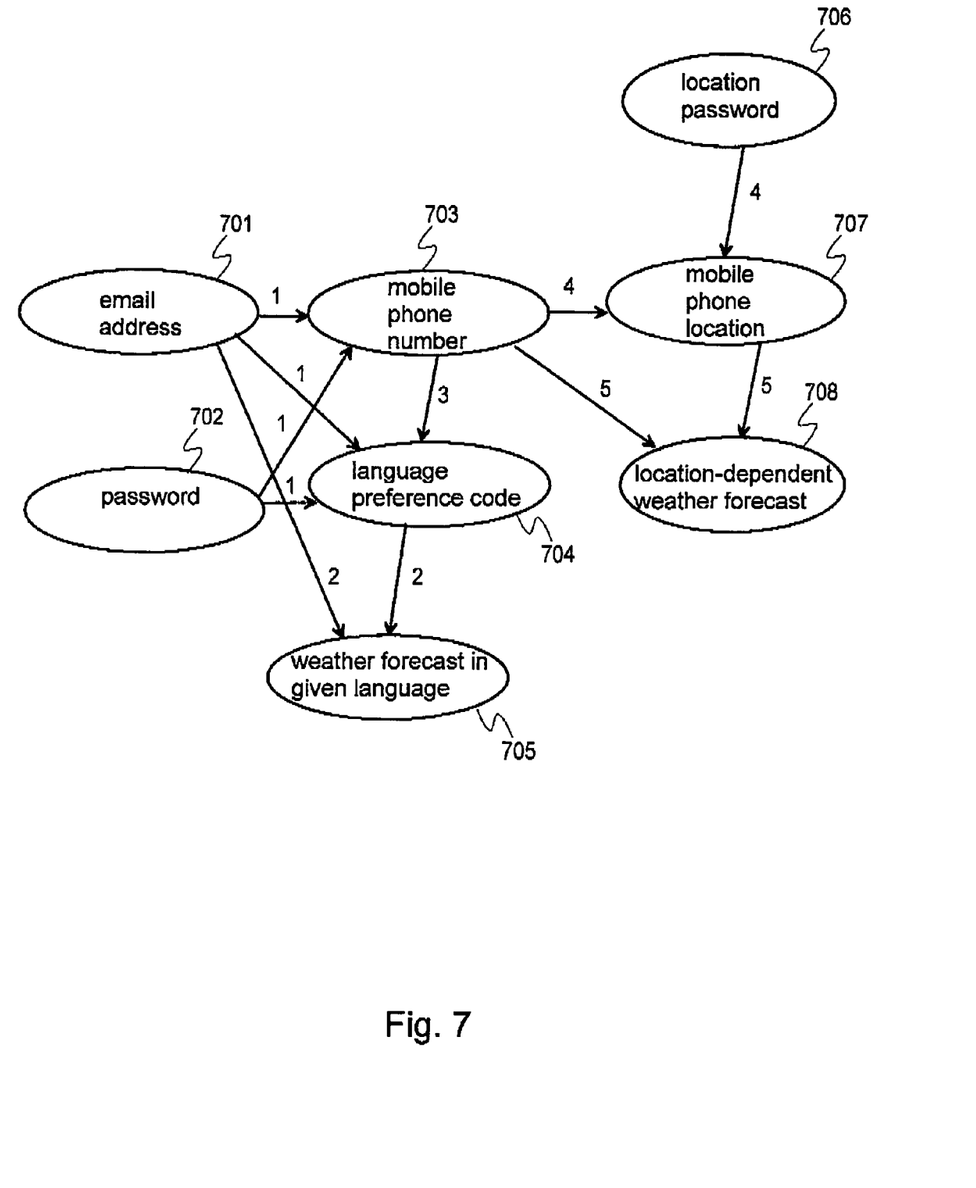
FIG. 7 shows schematically, as an example, a data model for five operations and eight parameters.

One can apply the automated translation mechanism in a more complex setting such as one where multiple systems participate in the processing and each system requires multiple input parameters and provides multiple output parameters. FIG. 7 illustrates, as an example, a data model for five operations and eight parameters. The data models can be created and analyzed, however, for much more complex systems by simply increasing the processing capacity of the computers or servers, where the data model creation and analyses is implemented.

In FIG. 7 the operations are illustrated as arrows and the parameters are illustrated as circles. Operation 1 may require an email address (circle 701) and a password (circle 702) to be given as input parameters and will provide mobile phone number (circle 703) and language preference code (circle 704) as output parameters. Operation 2 may require an email address (circle 701) and a language preference code (circle 704) as input parameters and will provide a weather forecast (circle 705) in the given language. Operation 3 may require a mobile phone number (circle 703) and will return language preference code (circle 704) as an output parameter. Furthermore, operation 4 may require a mobile phone number (circle 703) and a location (circle 707) as inputs and provide location-dependent weather forecast (circle 707) as an output.

The result of the reachability analysis, in this example, for a known email address 701 and a known password 702 is the following set of parameters: (mobile phone number 703, language preference code 704, weather forecast 705). For a known mobile phone 703 and a location password 706, the reachability analyses provides the location 707 of the mobile phone and a location-dependent weather forecast 708. In addition, it is possible to determine required operations to be invoked to reach e.g. the weather forecast 705 from the input parameters email address 701 and password 702. As a further example, for determining the location 707 of the mobile phone the location password 706 is needed. But if the location 707 is known originally, it is possible to obtain a location-dependent weather forecast 706 without the location password 706. If the mobile phone number 703 is the only originally known parameter, then only language preference code 704 can be obtained.

A method in accordance with one of the embodiments of the invention may be implemented as a software application. By installing and running the computer program in a computer or a server (for example, server 120 in FIG. 1), it is possible to provide reachability analysis or transformation path analysis, for example, over a communications network.

The data model about available services can be made beforehand, and reachability and/or transformation path analysis can be made using a stored data model. A computer equipped with automated translation mechanisms may further have means for invoking services/operations by calling a certain operation and using as an input certain parameter value or values. These values for input parameter(s) may have been received in the computer from a user (from a human user via the user interface) or from a local or remote software application. The local or remote software application may be provided on a computer-readable record medium. The invoked service then returns as an output certain further parameter value or values to the computer. The computer may, in turn, forward the output to the user. Alternatively, it may be possible to invoke the service so that the output is automatically directed to the user.

Service descriptions may be fetched, for example, periodically to a computer equipped with the automated translation mechanism, or the computer may be adapted to receive service descriptions from systems providing services, when the systems decide to send the service descriptions.

Term operation in this description and in the appended claims refers in the above to a function having at least one input parameter and providing at least one output parameter when invoked with the input parameter(s). An operation may be a network service or a part of a network service. An operation may also be an operation within a system. Thus the embodiments of the invention are applicable also to operations within a system. It shall be appreciated that an operation need not be invoked or provided over a communications network; they may be invoked or provided over a communications interface, for example, over an interface in an information technology system.

Above reference is made to Web Services Description Language, Simple Object Access Protocol and to Resource Description Framework. These are to be understood as examples for providing services or functionalities over a communication network or within an information technology system. The scope of the invention is intended to cover also other techniques and protocols suitable for the same purpose.

The transformation path analysis and reachability analysis are discussed as two applications, which the present invention enables. The invention is, however, not restricted to these applications. For example, transformation optimization can be used to select the most beneficial path from a source concept X to a target concept Z. The beneficiality can be determined, for example, in terms of economic cost or response times. This means that characteristics (for example, processing delay and/or cost) are associated with the operations, and the path from the source node to the target node is selected using a criterion depending on the characteristics of the operations along the path. The criterion can be, for example, minimizing the total cost or the total delay along the path. The criterion may also depend on more than one characteristic.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method for invoking a composite network service in a computer system, wherein the composite network service comprises a plurality of network services, each network service comprising operations, and each operation having a plurality of input parameters and a plurality of output parameters, the method comprising
    determining operations relating to the composite network service to be invoked and provided via a communication network by analyzing a data model having nodes representing the parameters and directed relations, wherein each directed relation represents an operation relating to at least one network service and connects at least one node representing each of said plurality of input parameters of an operation to at least one node representing each of said plurality of output parameters of the operation;
    determining, for the composite network service, a service invocation path in the data model from at least one node representing at least one given input parameter to at least one node representing at least one given output parameter;
    invoking operations relating to the composite network service along the determined service invocation path in an order in accordance with the service invocation path and using an output parameter of a previous operation as an input parameter for a next operation; and
    performing a reachability analysis to determine which of said plurality of output parameters is reachable based on one or more of said plurality of input parameters.

2. A method as defined in claim 1, wherein the service invocation path is determined using a transitive closure computation algorithm.

3. A method as defined in claim 1, comprising determining the output parameters represented by the nodes, which are accessible starting from a node representing a given input parameter.

4. A method as defined in claim 3, wherein the accessible nodes are determined using a transitive closure computation algorithm.

5. A method as defined in claim 1, comprising creating a preliminary data model, wherein the data model is created based on the preliminary data model.

6. A method as defined in claim 5, wherein the preliminary data model is created using service descriptions, a service description listing operations relating to a service and the input and output parameters relating to the operations.

7. A method as defined in claim 5, wherein a unique parameter identifier is defined in the preliminary data model for parameters referring to a single concept.

8. A method as defined in claim 5, wherein unique operation identifiers are defined in the preliminary data model for the operations.

9. A method as defined in claim 1, wherein the data model is created using service descriptions, a service description listing operations relating to a service and the input and output parameters relating to the operations.

10. A method as defined in claim 1, further comprising determining a node identifier based on a parameter identifier.

11. A method as defined in claim 1, further comprising determining a directed relation identifier based on an operation identifier.

12. A method as defined in claim 1, wherein a unique node identifier is determined for each concept to which the parameters refer.

13. A method as defined in claim 1, wherein a unique directed relation is determined for each operation.

14. A method as defined in claim 1, comprising:
    receiving service descriptions listing operations relating to network services and the input and output parameters relating to the operations; and
    creating the data model based on the service descriptions.

15. A method as defined in claim 14, wherein node identifiers for the data model are created using parameter identifiers in the service descriptions, a node identifier being indicative of the respective network service identified in the service description.

16. A method as defined in claim 14, wherein directed relation identifiers for the data model are created using operation identifiers in the service descriptions, directed relation identifier being indicative of the respective network service identified in the service description.

17. A method as defined in claim 1, further comprising storing a declarative description of the data model.

18. A computer program embodied on a computer-readable record medium comprising program instructions for causing a computer to perform a method for invoking operations in a computer system for providing services to users via a communication network, the operations involving parameters and each operation having a plurality of input parameters and a plurality of output parameters, the method comprising:
    determining operations relating to a composite network service to be invoked by analyzing a data model having nodes representing the parameters and directed relations, wherein the composite network service comprises a plurality of network services each comprising operations, and each directed relation represents an operation relating to at least one network service and connects at least one node representing each of said plurality of input parameters of an operation to at least one node representing each of said plurality of output parameters of the operation;
    determining, for the composite network service, a service invocation path in the data model from at least one node representing at least one given input parameter to at least one node representing at least one given output parameter;
    invoking operations relating to the composite network service along the determined service invocation path in an order in accordance with the service invocation path and using an output parameter of a previous operation as an input parameter for a next operation; and
    performing a reachability analysis to determine which of said plurality of output parameters is reachable based on one or more of said plurality of input parameters.

19. A computer for invoking a composite network service, wherein the composite network service comprises a plurality of network services, each network service comprising operations, the operations involving parameters and each operation having a plurality of input parameters and a plurality of output parameters, the computer comprising:
    means for determining operations relating to the composite network service to be invoked and provided via a communication network by analyzing a data model having nodes representing the parameters and directed relations each representing operations, wherein a directed relation represents an operation relating to at least one network service and connects at least one node representing each of said plurality of input parameters of the operation to at least one node representing each of said plurality of output parameters of the operation;

means for determining, for the composite network service, a service invocation path in the data model from at least one node representing at least one given input parameter to at least one node representing at least one given output parameter;

means for invoking operations along the determined service invocation paths in an order in accordance with the respective service invocation path and using an output parameter of a previous operation as an input parameter for a next operation; and performing a reachability analysis to determine which of said plurality of output parameters is reachable based on one or more of said plurality of input parameters.

20. An apparatus for invoking a composite network service, wherein the composite network service comprises a plurality of network services, each network service comprising operations, the operations involving parameters and each operation having a plurality of input parameters and a plurality of output parameters, the apparatus being configured to determine operations relating to the composite network service to be invoked and provided via a communication network based on analysis of a data model having nodes representing the parameters and directed relations each representing operations, wherein a directed relation represents an operation relating to at least one network service and connects at least one node representing each of said plurality of input parameters of the operation to at least one node representing each of said plurality of output parameters of the operation, to determine, for the composite network service, a service invocation path in the data model from at least one node representing at least one given input parameter to at least one node representing at least one given output parameter, to invoke operations along the determined service invocation paths in an order in accordance with the respective service invocation path, wherein an output parameter of a previous operation is used as an input parameter for a next operation; and to perform a reachability analysis to determine which of said plurality of output parameters is reachable based on one or more of said plurality of input parameters.

21. The apparatus as defined in claim 20, further configured to receive service descriptions relating to the network services, the service descriptions listing operations relating to services and the input and output parameters relating to the operations, and to create the data model based on the received service descriptions.

* * * * *